United States Patent Office 2,816,924
Patented Dec. 17, 1957

2,816,924

PROCESS FOR ARYLAMIDES

Penn F. Spitzer, Jr., South Bound Brook, N. J., assignor to American Cyanamid Company, New York, N. Y., a corporation of Maine No Drawing. Application November 15, 1955,
Serial No. 547,033

9 Claims. (Cl. 260—560)

This invention relates to a process for the preparation of aromatic amides, and more particularly, to an improved process for the preparation of arylamides of 2-hydroxy-3-naphthoic acid.

Amides of 2-hydroxy-3-naphthoic acid are extremely useful intermediates in the dyestuff industry. In the dyestuff trade, amides of this type are known as "Naphthols" and because of their important uses are produced in large quantities. Two such Napthols, which are particularly important, are the anilide of 2-hydroxy-3-naphthoic acid and the beta-naphthylamide of 2-hydroxy-3-naphthoic acid, known respectively in the dyestuff trade as "Naphthol AS" and "Naphthol ASSW." These Naphthols are used in the dye industry as coupling components with various diazo compounds. Although Napthol AS and Naphthol ASSW are of major importance, a large variety of other Naphthols are prepared from 2-hydroxy-3-naphthoic acid by amidation with other amines such as o- and p-toluidine; o- and p-anisidine; p-phenetidine; 2,5-dimethoxy aniline; m-nitroaniline; p-chloroaniline; various halogen derivatives of o-toluidine and o-anisidine; alpha naphthylamine; dianisidine; and the like. These are normally prepared by reaction of phosphorous trichloride on a mixture of 2-hydroxy-3-naphthoic acid and the aromatic amine in a suitable inert medium, such as monochlorobenzene.

These reactions have been developed to the point where quite high yields are obtained. However, substantial savings are still possible by reducing the amount of labor and handling involved. In the production of such chemicals, overhead costs are also considerable. In large volume production of chemicals with a low profit margin, it is especially important to produce as much of the product with as little labor as possible and with a minimum of equipment, for such savings can be the difference between a profit and a loss on the item. However, in the process of preparing the Naphthols, as described above, the amount of the Naphthol which may be prepared in a given amount of medium (monochlorobenzene) and consequently in a given batch volume, is limited because of mechanical stirring difficulties. Thus, for best results, the reaction is run at such a concentration that the reaction mass is a fine, slightly viscous slurry, especially as the reaction product forms. Very thorough stirring is necessary to obtain proper reaction conditions and satisfactory yields. It would be desirable to increase the concentration of the raw materials to increase the batch size in the available equipment, thus, reducing labor and overhead costs. However, if the concentration of the raw materials, and therefore the amount of product per batch is increased, the mass becomes too thick and approaches a semi-solid form in which adequate stirring is impossible. Under these conditions, yields and quality of material are unsatisfactory. The use of higher concentrations, with the corresponing increase in batch sizes for a given size of equipment, would result in substantial savings and an improved and more economical process. Heretofore, this has not been possible and the concentration limitations have made it impossible to increase the production capacity of the equipment.

The present invention is based on the discovery that, by adding a non-ionic surface active agent of the polyoxyethylene fatty acid ester class to the naphthol reaction mixture and completing the reaction in the presence of the agent, greatly increased concentration of reactants in the vehicle may be used while still maintaining effective stirring, resulting in greatly increased amounts of product per unit volume of reaction mixture. This affords, in turn, a greater saving in labor and overhead costs and results in an economical and improved process. The concentration of the reactants in the vehicle may be increased to about 150% of the usual concentration, thus, producing one and one half times as much product for given labor and overhead costs. There is furthermore, an improvement in the quality of the product as shown by a whiter appearance, absence of insoluble impurities, and greater purity by chemical analysis. The absence of insoluble impurities is especially important in the application of these intermediates. There is also a definite improvement in the yield of the reaction.

The great improvement in the process is most surprising, since by the addition of such a small amount of agent, greatly increased concentrations of the reactants may be used. It is all the more surprising since other classes of surface active agents, in general, give little or no improvement. It is not known just why this particular type of surface active agent is so useful in the process, and I do not wish to be limited by any theory thereon.

The surface active agent which is used in my invention, must be of the polyethylene oxide fatty acid ester type. The fatty acids which can be used include rosin acids and any of the common saturated and unsaturated aliphatic acids of carbon chains greater than twelve carbon atoms such as lauric, myristic, palmitic, stearic, oleic, elaidic, linoleic, ricinoleic, erucic, brassidic acids, and the like. Most of these occur naturally in various fats, usually as mixtures, and may be used in the preparation of the surface active agents, either as such mixtures of acids without separation into individual components or as the pure acid. Especially useful for our invention are the surface active agents derived from tall oil, which is a mixture of acids such as oleic, ricinoleic, linoleic and the like with rosin acids. Agents prepared from tall oil exhibit greater thermal and chemical stability and, hence, are preferred. The surface active agent is prepared either by direct reaction with ethylene oxide or by esterification of the acids by polyethylene glycols. The properties of the surface active agent will vary with the number of oxyethylene units in the molecule. Agents prepared from the various acids and having polyethylene oxide chains of from 2 to 60 ethylene oxide units may be used in this invention to achieve the desired effect. Preferably, however, an average of about 16 polyethylene oxide units should be present to achieve the best advantages of our invention.

The amount of the surface active agent to be used in my improved process is not particularly critical and may range from a minimum of about 0.40 to 5 or more parts of the agent per 100 parts of 2-hydroxy-3-naphthoic acid. However, for best results, we prefer to use about .75 to 1.7 parts. More than 2.0 parts may be used but there is not a proportional improvement and additional usage, therefore, becomes uneconomical.

In the practice of the invention, a mixture of the reaction medium, 2-hydroxy-3-naphthoic acid and the surface active agent is partially distilled to remove any water present. The presence of water has a deleterious effect on the reaction and these surface active agents often contain water. Depending upon the presence or absence of water in the agent, the surface active agent may be added before or after dehydration but must be added before the amine for best results. The amine is then added and the mixture is heated to about 70° C. The phosphorus trichloride is then added gradually and the mixture then is heated to the reflux temperature and held at the reflux temperature until the reaction is substantially complete. The mixture is stirred throughout the reaction. The change is then cooled and the solid product is removed by filtration, washed, and dried.

Although monochlorobenzene is preferred as the reaction medium, other suitable liquids may be used. The only pre-requisite is that the reaction medium be inert to the various reactants (the organic acid, the amine, and the chlorinating reagent) and be liquid throughout the temperature range employed. Among the media which can be used in place of monochlorobenzene are benzene, toluene, xylene, dichlorobenzene, nitrobenzene, ligroin and the like.

Although phosphorus trichloride is used preferably as the chlorinating agent, other well known reagents for preparing acid chlorides are also usable, such as phosphorus oxychloride, phosphorus pentachloride, and thionyl chloride.

Alternatively, the acid chloride of beta-oxynaphthoic acid can be prepared separately and the chlorinating agent can be omitted. This process has some disadvantages, since it needs two steps, and the acid chloride preparation must be carried out carefully, but it comes within the scope of my invention since such a reaction mixture will also thicken as the amide is formed.

The invention is further illustrated by the following examples, in which parts are by weight unless otherwise specified.

*Example 1*

To a reactor are charged 420 parts of monochlorobenzene and 60 parts of 2-hydroxy-3-naphthoic acid. Any water present is removed by distillation of monochlorobenzene until the distillate is water-free. Sufficient monochlorobenzene is added to replace that which was removed by distillation. To this mixture are then added 0.3 part of sodium dioctyl sulfosuccinate and 35 parts of aniline. The whole then is heated to 70° C. The sodium dioctylsulfosuccinate is used to prevent adhesion to the walls of the kettle. The temperature of the charge is maintained between 68° and 70° C. and 17.6 parts of phosphorus trichloride are then added gradually. Following the addition of the phosphorus trichloride, the mixture is heated to the reflux temperature (134–136° C.) until the reaction is substantially complete. The mixture, which is in the form of a creamy paste, is stirred throughout the reaction period.

The mixture is then cooled and the solid product is removed by filtration and washed with monochlorobenzene, with a 0.5% solution of sodium alkyl naphthalene sulfonate, then with 2½% sodium bicarbonate solution, and finally with water. The solid product is dried, giving a yield of 80 parts of the anilide of 2-hydroxy-3-naphthoic acid.

If the amounts of 2-hydroxy-3-naphthoic acid, aniline, and phosphorus trichloride are increased, the batch becomes unstirrable and unsatisfactory yields are obtained.

*Example 2*

To the reactor are charged 420 parts of monochlorobenzene, 90 parts of 2-hydroxy-3-naphthoic acid and 1 part of a polyoxyethylene ester of tall oil containing an average of 16 oxyethylene units. Any water present is removed by distillation of monochlorobenzene until the distillate is water-free. Sufficient monochlorobenzene is added to replace that which was removed during the distillation. To the mixture is then added 53 parts of aniline. After heating to 70° C., 27 parts of phosphorus trichloride is added gradually. The mixture is then heated at the reflux temperature (134–136° C.) until the reaction is substantially complete. The mixture which is in the form of a creamy paste is stirred throughout the reaction period.

The charge is then cooled, the solid product is removed by filtration and washed with monochlorobenzene to remove mother liquor, then with a 0.5% solution of sodium alkyl naphthalene sulfonate to remove monochlorobenzene, then with a 2.5% sodium bicarbonate solution to remove 2-hydroxy-3-naphthoic acid, and finally with water. After drying, 121 parts of product is obtained. The product here is lighter in color and contains less insolubility impurities than the product obtained in Example 1.

*Example 3*

To a reactor are charged 420 parts of monochlorobenzene and 44 parts of 2-hydroxy-3-naphthoic acid. Any water present is removed by distillation of monochlorobenzene until the distillate is clear and free of water. Sufficient monochlorobenzene is added to replace that which was removed by distillation. To the mixture is then added 0.2 part of sodium dioctylsulfosuccinate and 33 parts of beta-naphthylamine. The charge is then heated to 70° C. whereupon 12.8 parts of phosphorus trichloride then are added gradually, maintaining a temperature of 68–70° C. The batch is then heated at the reflux temperature (134–136° C.) until the reaction is substantially complete. The mixture, in the form of creamy paste, is stirred throughout the reaction period.

The charge then is cooled and the solid product is removed by filtration and washed with monochlorobenzene to remove mother liquor, then with a 0.5% solution of sodium alkyl naphthalene sulfonate to remove monochlorobenzene, a 2.5% sodium bicarbonate solution to remove 2-hydroxy-3-naphthoic acid, water, a 5% hydrochloric acid solution to remove any amine present, and, finally, with water until neutral. The product is then dried, giving 67 parts of the beta-naphthyl amide of 2-hydroxy-3-naphthoic acid.

*Example 4*

The procedure of Example 3 is followed except that 66 parts of 2-hydroxy-3-naphthoic acid are used in place of 44 parts, 50 parts of beta-naphthylamine are used in place of 33 parts, 19.2 parts of phosphorus trichloride are used in place of 12.8 parts and 0.3 part of an ester of polyoxyethylene and tall oil, averaging 16 oxyethylene units, are added and the sodium dioctyl sulfosuccinate is omitted.

A yield of 99 parts of the beta-naphthylamide of 2-hydroxy-3-naphthoic acid is obtained, having a lighter color and containing less insoluble impurities than the product obtained in Example 3.

*Example 5*

To a reactor are charged 420 parts of monochlorobenzene, and 1 part of a polyoxyethylene ester of tall oil containing an average of 16 oxyethylene units. Any water present is removed by distillation of monochlorobenzene until the distillate is water free. Sufficient dry monochlorobenzene is added to replace that which was removed by distillation. To the mixture are added 53 parts of aniline and 99 parts of 2-hydroxy-3-naphthoyl chloride. The mixture is then heated at the reflux temperature (134–136° C.) until the reaction is substantially complete. The mixture which is in the form of a creamy paste is stirred throughout the reaction period.

The charge then is cooled and the product is isolated by the procedure described in Example 2. Similar results are obtained.

*Example 6*

The process of Example 2 is followed using an ester of tall oil from a polyoxyethylene of two oxyethylene units. The results obtained are similar to those of Example 2.

Example 7

The process of Example 2 is followed using an ester of tall oil from a polyoxyethylene of 30 oxyethylene units. The results are similar to those of Example 2.

Example 8

The process of Example 2 is followed using a polyoxyethylene palmitate averaging about 15 oxyethylene units. The results are similar to those of Example 2.

Example 9

The process of Example 2 is followed using a polyoxyethylene stearate averaging 25 oxyethylene units. The results are similar to those of Example 2.

I claim:

1. In the process of preparing arylides of 2-hydroxy-3-naphtholic acid by the reaction of 2-hydroxy-3-naphthoic acid with an aromatic amine in the presence of a compound of the group consisting of phosphorus trichloride, phosphorus oxychloride, phosphorus pentachloride, and thionyl chloride in an inert liquid reaction medium, the improvement which comprises carryng out the reaction in the presence of at least 0.4 part per 100 parts of 2-hydroxy-3-naphthoic acid of a non-ionic surface active agent comprising essentially esters of polyoxyethylene of acids selected from the group consisting of long chain fatty acids, long chain unsaturated aliphatic acids and mixtures of these with rosin acids.

2. The process of claim 1 in which the chlorinating agent is $PCl_3$.

3. The process of claim 2 in which the reaction medium is monochlorobenzene.

4. The process of claim 3 in which the source of the fatty acids used to form the surface active agent is tall oil.

5. The process of claim 4 in which the polyoxyethylene chain of the surface active agent averages about 16 oxyethylene units.

6. The process of claim 5 in which from 0.4 to 5.0 parts of the surface active agent are used.

7. The process of claim 6 in which the arylide being prepared is the anilide.

8. The process of claim 6 in which the arylide being prepared is the beta-naphthylamide.

9. In the process of preparing arylides of 2-hydroxy-3-naphthoic acid by the reaction of 2-hydroxy-3-naphthoyl chloride with an aromatic amine in an inert liquid reaction medium, the improvement which comprises carrying out the reaction in the presence of at least 0.4 part per 100 parts of 2-hydroxy-3-naphthoyl chloride of a non-ionic surface active agent comprising esters of polyoxyethylene of unsaturated long chain aliphatic acids.

References Cited in the file of this patent

UNITED STATES PATENTS

| | | |
|---|---|---|
| 2,394,279 | Weiss et al. | Feb. 5, 1946 |
| 2,454,808 | Kirkpatrick et al. | Nov. 30, 1948 |
| 2,469,493 | Barker | May 10, 1949 |
| 2,677,700 | Jackson et al. | May 4, 1954 |